Figure 1:
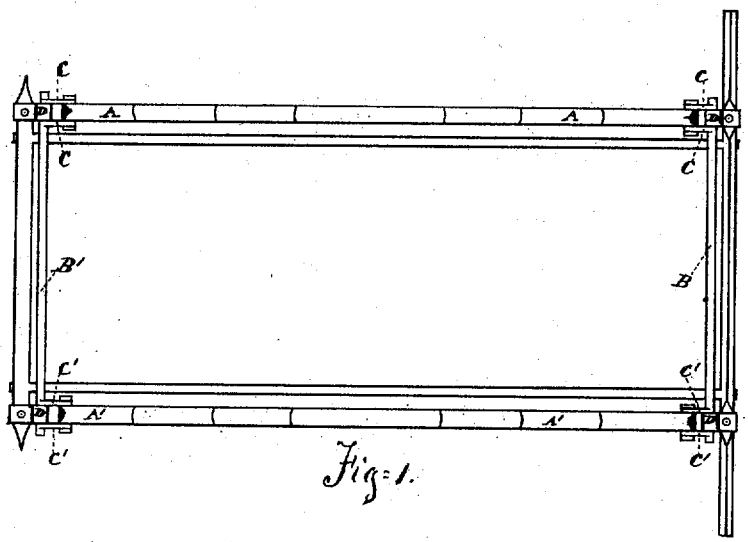

JOHN A. TOPLIFF & GEORGE H. ELY.

Connecting Carriage Springs.

No. 4,857. Reissued April 9, 1872.

Witnesses.

F. Salade

S. B. Hammond

Inventors.

John A. Topliff

Geo. H. Ely

BEST AVAILABLE COPY 4,857

UNITED STATES PATENT OFFICE.

JOHN A. TOPLIFF AND GEORGE H. ELY, OF ELYRIA, OHIO.

IMPROVEMENT IN CONNECTING CARRIAGE-SPRINGS.

Specification forming part of Letters Patent No. 122,079, dated December 19, 1871; reissue No. 4,857, dated April 9, 1872.

SPECIFICATION.

Be it known that we, JOHN A. TOPLIFF and GEORGE H. ELY, of Elyria, in the county of Lorain and State of Ohio, have invented certain Improvements in Connecting Springs to Vehicles, of which the following is a specification embodying our invention:

Our invention relates to side half-elliptic-spring vehicles, and has for its object suspending the front and rear ends of the springs directly to the rear axle and front bolster of the running-gear by means of two separate connecting-rods, the outer ends of which have formed upon them, as a part of the same and at right angles with the rod, short arms, between which the ends of the springs, respectively, are secured and operated—the connecting-rod receiving the rear ends of the springs being hinged to the rear axle, while the rod receiving the front ends of the springs is in like manner connected to the front bolster in such manner that the vibration of the springs will impart a corresponding rotation to the connecting-rods, front and back, and so that the depression of either spring will, by the rotary action imparted to the connecting-rod, compel a corresponding depression of the other, and thus compel both springs to vibrate together and move in unison one with the other, equalizing their action and the weight imposed upon them, as well as to prevent side motion to the body of the vehicle.

We are fully aware that to attain the object hereinbefore recited by means of connecting-rods placed at right angles across the front and rear of the running-gear of vehicles, and hinged to the front bolster and rear axle, or upon perches, and in close proximity to the bolster and axle, is an old device, and which is no part of our invention.

We deem it proper in this connection to cite the instances of prior use of connecting-rods for the purpose of equalizing the load imposed upon the springs of vehicles, as also the equalization of the action of the springs, so far as known to us, the better to illustrate the distinctive difference between our invention and all others pertaining to the use of the connecting-rod for the purposes specified. The first instance we cite is the patent granted to Joshua Jones, Allen M. Eells, and Horace Griswold, No. 842, and dated the 16th day of July, 1838. In this patent is clearly shown two separate connecting-rods, one hinged to the hind axle and rear end of the body, and the other to the front bolster and front end of the body, and arranged in combination with a coiled or scroll spring, located about midway between the front bolster and rear axle. Secondly, we cite the rejected application for a patent of Eli Petteys, rejected upon the patent last-above cited on the 27th day of July, 1850. Here also two separate connecting-rods are shown—one across the front and one across the rear of the running-gear—but no side springs are shown in combination therewith. The third and fourth we cite in the two several patents granted to Anson C. Stowe, dated November 24, 1868, and December 22, 1868. In both of these patents two separate connecting-rods at right angles across the running-gear are shown and described, the one in connection with C-springs, and the other with side springs; but in the last-named case the connecting-rods are not connected directly with the ends of the springs. And, finally, the last case we cite is the patent granted to John B. Augur, No. 108,085, and dated the 11th day of October, 1870. In this patent side springs are used, the front ends of which are hinged upon fixed and rigid standards, secured upon the top of the front bolster, and where the front ends of the spring are firmly held in a central position over said bolster, while the rear ends are hinged to hinges secured to the outer ends of a single connecting-rod, placed over the top of the rear axle in such manner that as the springs are lengthened by depression a corresponding rotation is imparted to the connecting-rod. In this case provision for the lengthening of the springs when depressed or in motion is only made for the rear ends of the springs, the front ends being firmly held over the center of the bolster; and hence, as the load upon the springs is increased, and as only their rear ends, in combination with said links and connecting-rod, are permitted to accommodate their vibration, the rear end of the body is caused to have a backward tipping motion—that is, the back end of the body is thrown lower than the front when the springs are depressed to their full capacity, which is an objectionable feature in this device for equalizing the action of springs. Besides, as only the rear ends of the springs are allowed to act, that easy and natural motion of the springs which is only had by allowing both ends to act freely is in a great measure lost.

The radical difference of our invention from each and all of the cases above cited is, first, in the construction of the connecting-rod; and secondly, in suspending both ends of the springs upon separate connecting-rods, and thus allow both ends of the springs to act freely and in harmony with their vibrating motion, to which is added the other important advantage—viz., that our arrangement of connecting-rods admits of their application to side-spring vehicles of the ordinary kind now in use, as readily as to those built expressly for the purpose—an advantage not attained by any other previously-known combination of connecting-rods with the springs or bodies of vehicles.

Figure 2:
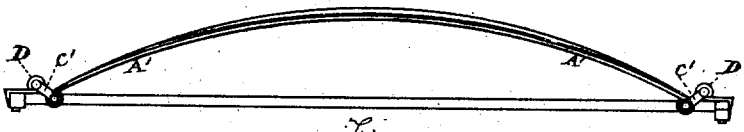

In the drawing, Figure 1 represents a top view of the hind axle, perches, and front bolster of a carriage running-gear, and Fig. 2 is side-view of the same.

A A and A′ A′ are the springs; B B′, the connecting-rods, which turn freely in the bearings D D D D; C C and C′ C′ are short arms formed upon the outer ends of the connecting-rods by being welded or otherwise fastened thereto and made a part of the same, and between which the ends of the springs are secured and operated by a passing bolt, as clearly shown in the drawing. D D are the bearings which attach the connecting-rods to the rear axle and to the front bolster. The arms C C C′ C′ being formed solid with the connecting-rods, when the spring A vibrates so as to lengthen or contract, causes the arms C C to move accordingly, when the same movement will be transmitted through the connecting-rod to the arms C′ C′, which will cause the opposite spring A′ to lengthen or contract in like proportion, or nearly so, the same as spring A.

With the several parts combined, arranged, and operating as clearly shown and described, it is self-evident that both the front and rear ends of the springs must act freely upon their suspended bearings between the arms C C′ of the connecting-rods B B′ under the pressure of the weight imposed upon them, and in unison with each other; and the position of the arms being always downward at their outer ends, those of each connecting-rod, while moving together, can also move with each separate rod independent of the other, as when a greater proportion of the weight carried is nearer the front or rear end of the springs, or, as when the front wheels strike an obstacle in the road which is missed by the hind ones, or vice versa.

*Claim.*

We claim—

The arms C C C′ C′, arranged upon separate connecting-rods B B′, secured directly to the hind axle and front bolster, to cause both ends of the side springs to yield simultaneously and in unison with each other, in the manner shown and described.

JOHN A. TOPLIFF.
GEO. H. ELY.

Witnesses:
W. SALADEE,
T. B. HAMMOND.